United States Patent [19]
Fiorentini

[11] Patent Number: 4,737,091
[45] Date of Patent: Apr. 12, 1988

[54] POLYURETHANE MOLDING PLANT COMPRISING MOTORIZED MOLD SUPPORTING CARRIAGES MOVABLE ON MONORAIL

[75] Inventor: Carlo Fiorentini, Saronno, Italy

[73] Assignee: Afros, S.p.A, Varese, Italy

[21] Appl. No.: 41,002

[22] Filed: Apr. 21, 1987

[30] Foreign Application Priority Data

May 2, 1986 [IT]  Italy ................................ 20281 A/86

[51] Int. Cl.⁴ ...................... B29C 41/02; B29C 39/04; B29C 39/36
[52] U.S. Cl. .................................. 425/88 R; 249/161; 249/170; 425/4 R; 425/139; 425/150; 425/165; 425/441; 425/442; 425/447; 425/817 R
[58] Field of Search .................. 425/4 R, 817 R, 253, 425/259, 261, 88, 139, 135, 441, 442, 447, 150, 165; 249/160, 161, 162, 170

[56] References Cited

U.S. PATENT DOCUMENTS

| | | | |
|---|---|---|---|
| 3,599,282 | 8/1971 | Meyers | 425/4 R |
| 3,732,052 | 5/1973 | Gunia | 425/88 |
| 3,739,050 | 6/1973 | Koncz et al. | 425/88 |

*Primary Examiner*—Willard Hoag
*Attorney, Agent, or Firm*—Cushman, Darby & Cushman

[57] ABSTRACT

A plant for molding articles in polyurethane material; the plant comprises a plurality of motorized mold supporting carriages independently movable along a suspended monorail running along a production line. Each carriage comprises a mold supporting press for opening and closing a mold provided with independent pneumatic control means supported by the same carriage; the control means are connectable to a source of fluid under pressure in pre-established working positions along the production line; each carriage also comprises a drive unit connected to electrical power supply bus bar along the monorail and a peripheral control unit operatively connected to a central logic unit by dialogue conductors provided on the monorail.

10 Claims, 4 Drawing Sheets

POLYURETHANE MOLDING PLANT COMPRISING MOTORIZED MOLD SUPPORTING CARRIAGES MOVABLE ON MONORAIL

BACKGROUND OF THE INVENTION

This invention refers to a system or plant for molding polyurethane articles, comprising molds supported by carriages or trolleys movable along a suspended monorail.

In the mass production of polyurethane articles, there are substantially two types of molding systems, in which the molds are made to move along a pre-established path and through various work stations in order to carry out the operations of opening the molds to remove the molded articles, cleaning and filling the molds with metered quantity of a foamable polyurethane mixture, and closing the molds to permit the final stage of polymerization of the resin.

According to the first type of plant, a limited number of molds are secured to a rotary table. The table is made to turn step by step with pre-established intervals of time, in order to bring each individual mold in correspondence with the various work stations. This type of system or plant has the advantage of allowing the polyurethane mixture to be fed in with the mold in a stationary condition. However, it presents numerous drawbacks such as, for example: the limited number of molds that can be used, difficulty and long pauses for the removal, replacement and/or maintenance of the individual molds, with a consequent reduction in the productivity of the system, and lastly, no or very little operative flexibility which limits the possibility of adapting or utilizing a system for various production requirements. Moreover, the rotary table systems are complicated in structure, take up a considerable amount of space and do not offer the operator easy access to the open molds. In order to at least partially remedy the limited productive capacity and the lack of operative flexibility of rotary table systems, so-called "roundabout" systems have been designed, in which the individual molds are mounted on their respective carriages which move on wheels along a circular path, on one side of which are arranged the various work stations; the individual carriages are interconnected by means of a motor driven chains.

According to this type of plant, the hydraulic control devices are connected to a steady source of fluid under pressure by means of flexible pipes and a rotary distributor, or to movable sources of fluid under pressure which also run on carriages along the production line. Compared to the previous rotary table system, this system offers the advantage to arrange the production line differently and to remove each individual carriage from the work path by conveying them towards a separate area for maintenance and/or replacement of the mold. However, the operation of disconnecting and reconnecting a carriage to the driving chains and to the source of fluid under pressure is complicated and difficult to carry out when the carriage is moving. Consequently, it is necessary to stop the entire production line for the length of time required for removing and/or replacing one carriage with another. Moreover, since it is virtually impossible to stop the entire line of carriages in positions perfectly aligned with the apparatus for injecting or feeding the polyurethane into the individual molds, the polyurethane material must be fed with the carriage in motion, along a short section of its working stroke. Consequently, whereas on the one hand the movable carriage system offers the advantage of a different disposition and organization of the plant, and the possibility of removing and replacing the carriages, stopping the plant just long enough to disconnect and reconnect them to the driving chains and to the feed conduits for the fluid under pressure, on the other hand it calls for the plastic material to be fed with the molds in motion, which proves to be somewhat undesirable and somewhat unadvisable for molds of large dimensions or with particular shapes, in that it is difficult to obtain a correct and even distribution of the polyurethane in the mold when operating with the molds in motion.

Moreover, the same carriage system cannot easily be adapted to meet the various production requirements, due to the fact that the carriages are all made to move simultaneously at the same speed which, like the rotary table system, must make allowances for the working times established by the entire production process.

It would therefore be desirable to have a polyurethane molding system which combines the advantageous features of the previous systems, such as the possibility of feeding the polyurethane mixture with the mold stationary, in a suitable position, as in the rotary table systems, and the possibility of supporting the molds so that they can be easily replaced, in a separate area from the working line, as in the present carriage type systems, thereby permitting greater flexibility in terms of control, operation and design and ridding the system of any dangerous obstacles on the ground, along the path of the carriages and in particular in the areas in which an operator intervenes.

Consequently, an object of this invention is to provide a polyurethane molding plant capable of achieving the above-mentioned advantages while at the same time greatly simplifying the structure, operation and control of the system itself by providing an independent and programmable drive mechanism for each individual mold.

A further object of this invention is to provide a plant of the aforementioned type, which offers the possibility of positioning the individual molds on carriages which can be made to move independently from one another, even at different speeds, along the entire path of the production line, and to stop from time to time at the various work stations without affecting the movement of the other molds.

A still further scope of this invention is to provide a plant as described, in which the individual mold supporting carriages can be guided and diverted from the main production line towards one or more separate service areas, with the possibility of returning to the production line whenever required, without hindering or interfering with the movement of the remaining molds. A still further scope so this invention is to provide a plant with mold supporting carriages completely independent from one another, which offers the greatest freedom in designing and locating the various work stations and the possibility of creating additional or alternative paths, and which can all be monitored automatically by a central logic unit.

SUMMARY OF THE INVENTION

This can be achieved by providing each individual mold on a self-propelling or motorized carriage running along a suspended monorail and by providing each carriage with a peripheral control unit capable of carrying on a dialogue with a central logic unit; each individual carriage is provided also with a pneumatic control system for controlling the opening, closing and overturning conditions of the mold along the production line, which frees said carriage from any permanent connection with a fluid source, thereby achieving ample freedom and versatility in the movement and use of the molds. The use of self-propelling carriages running along a monorail, even though per se known in other application fields simply for handling goods in warehouses it is now proposed for the first time in congiuntion with polyurethane molding systems, and in combination with an independent pneumatic control system for each single carriage, thereby making considerable technical progress in this specific field, which was neither obtainable nor foreseeable on the basis of the systems previusly in use.

This invention will be illustrated in greater detail hereunder, with reference to the figures of the accompanying drawings, which are given purely by way of example and which do not intend to exhaust or limit the numerous possible modifications which can be achieved on the basis of the innovatory principles set forth herein.

DESCRIPTION OF THE INVENTION

Figure 1:
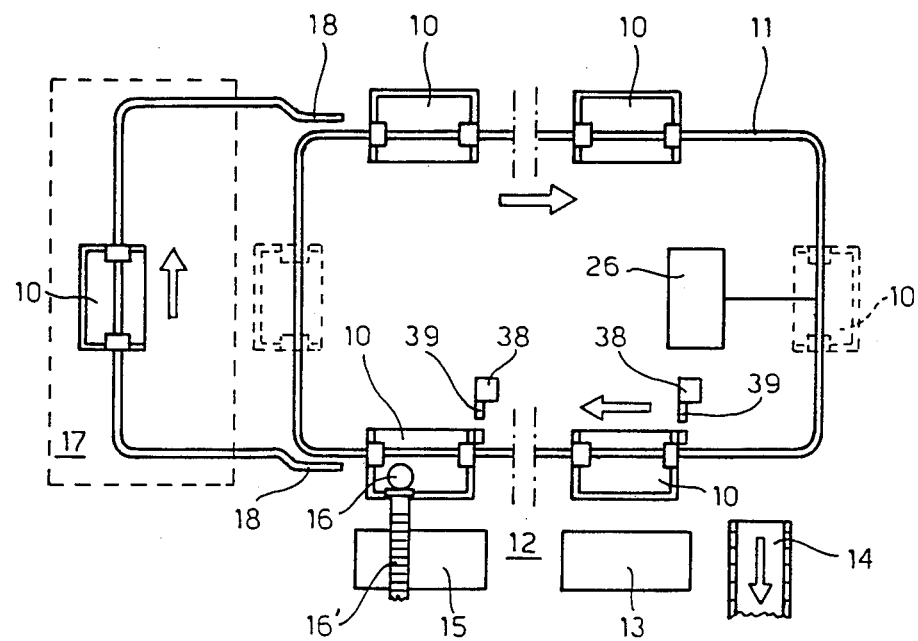
FIG. 1 shows a simplified diagram of a molding system according to the invention.
Figure 2:
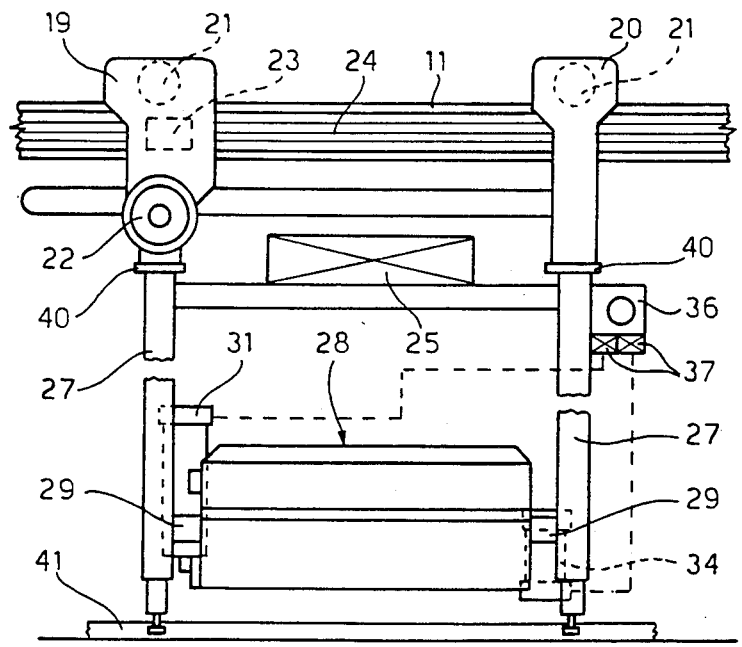
FIG. 2 shows a front view of mold supporting carriage movable along a monorail complete with pneumatic and mechanical devices for opening, closing and overturning the mold.

FIG. 1 shows the layout of a generic polyurethane molding system according to the present invention; the system comprises a plurality of self-propelled mold supporting carriages 10, which run on monorail 11 along an anular path of a production line for producing molded articles of polyurethane material. The production line shown comprises a work area 12 in which are located, for example, a demolding station 13 for removing the molded articles from the individual molds, and for preparing the same molds for a subsequent molding operation, a conveyor 14 or other suitable means for conveying the demolded articles from the individual molds away from the work area, and a station 15 for feeding a polyurethane mixture into the molds by means of one or·more mixing heads 16 provided on a movable arm 16' or in any other suitable way. Reference 11' of FIG. 1 indicates the monorail of an alternative path or of an additional work line for transferring the carriages or some of them to a work area 17 separate from the main production line; the monorail 11' of the additional path is connectable to the monorail 11 of the main line by means of automatic points as switches 18 which enable each individual carriage 10 to be switched from the main path and later reinserted.

As shown in FIGS. 2 to 5, each mold supporting carriage 10 comprises a drive unit or trolley 19 and a idle unit 20 mechanically linked together. In particular, the drive unit 19 comprises an upper driving wheel 21 running on the rail 11; said wheel is connected to the shaft of an electric motor 22 which, by means of a set of sliding contacts 23, is powered by electric conductors or bus bars 24 positioned on one side of the monorail 11; a number of dialogue conductors 24 also serve the purpose of transmitting and receiving control signals from a peripheral logic unit 25 provided on each carriage to a central logic unit 26; each unit 25 is capable of carrying on a dialogue with the ventral logic unit 26 which can be programmed to monitor the entire system.

Hinged to the drive unit 19 and the idle unit 20 is a metal frame 27 which supports a press 28 containing a mold. The press 28 comprises a lower portion 28a which is tiltable on a horizontal axis defined by lateral pivots 29 of the supporting frame 27. The press 28 also comprises an upper portion 28b to which the lid of the mold is secured, and which is hinged by hinge 30, to the lower press portion 28a, the horizontal axis of rotation of the upper portion 28b being parallel to the axis defined by the pivots 29. The press 28, and therefore the mold placed inside it, is made to open and close by means of a first pneumatic cylinder 31 pivoted, at 32, to the upper portion 28b of the press and whose piston rod is pivoted, at 33, to the lower portion 28a of the press. Correspondingly, all the other controls of the mold and supporting press are achieved pneumatically, and completely independently for each carriage, by providing for example a second pneumatic cylinder 34 for the tilting movements of the press, as shown in the sequence of the various figures; said cylinder 34 is pivoted at 35, to one side of the frame 27 and its piston rod is pivoted at 33, or any other suitable point, to the lower press portion 28a.

As mentioned previously, a feature of the system according to this invention consists in the total independence of the movement and control of each mold supporting carriage, including the pneumatic device designed to open and close the mold and to rotate the press, thanks to absence of any device or parts connected with a fixed structure or to an external sources of energy, with the exception of the electric conductors along the monorail. This total independence permits maximum freedom of movement of the individual mold supporting carriages, and is made possible by the combination of self-propelling carriages on a monorail, with the pneumatic control devices on each single carriage independently connectable to a source of compressed air at pre-established points of the work line; this may be achieved by means of connecting devices which can be connected and disconnected automatically or manually in the fixed working points of the line with the carriage at a standstill.

In this connection, each carriage 10 is provided, on one side of the frame 27, with a pneumatic manifold 36 which is connected by check valves 37 to the individual pneumatic control members, such as the aforesaid cylinders 31 and 34. The valves can be actuated electrically by the peripheral unit 25 or in any other way, to control the feeding and vent of the compressed air. Each manifold 36, for example in the work stations 13 and 15 of the system, or wherever required, is tightly connectable to and disconnectable from a source of fluid under pressure 38, for example by means of a male coupling member provided on a movable arm 39 which penetrade a female coupling member 36a on the manifold 36. Alternatively, each carriage 10 can be provided with a reserve air tank having a certain amount of autonomy for a limited number of drive operations, which can be recharged from time to time at one or more fixed points of the system.

As was pointed out previously, the frame 27 of each carriage is pivoted, at 40, on a horizontal axis, both to the drive unit 19 and to the idle unit 20; consequently, whenever it is necessary to prevent any lateral movement of the frames supporting the molds, or whenever it is desired or necessary to slope said frames sideways, an additional guide rail 41 can be provided in pre-established sections of the carriage path, either at floor level or embedded in the floor itself, along which runs a idle roller or sliding member 42 provided on the lower end of an arm or an extension of the frame 27. In any case, the presence of a supplementary guide rail 42 at floor level does not constitute a bar nor does it hinder the work of the operator who, unlike in the conventional carriage systems, can come closer to the molds in the work stations, without any danger whatsoever.

Figure 3:
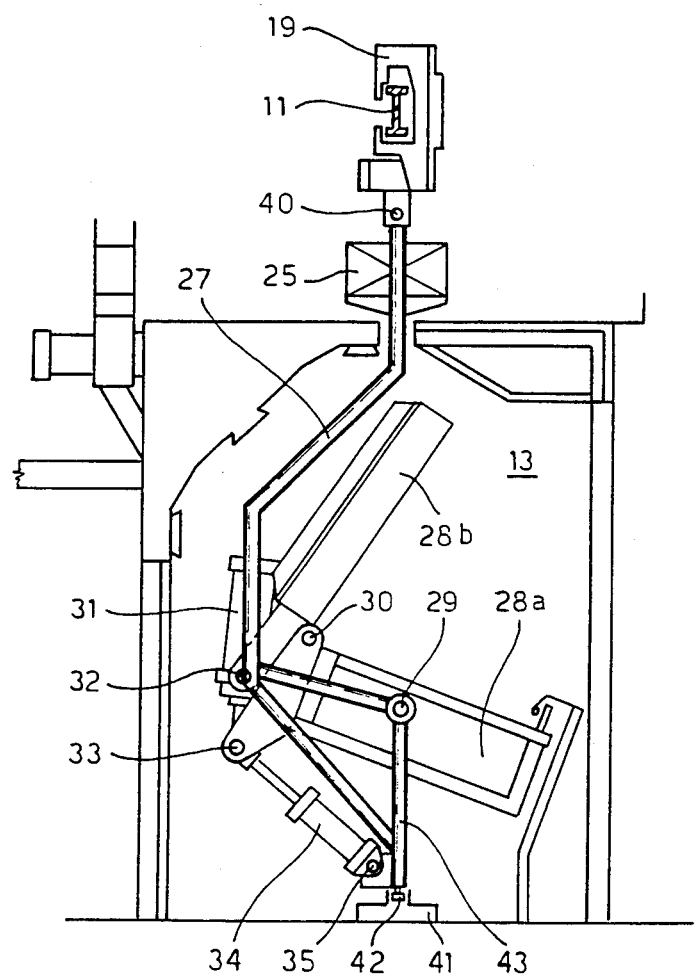
FIG. 3 shows a side view of a mold supporting carriage, standing at the work station where the molded articles are demolded or where the molds themselves are prepared, with the mold open and sloping towards the operator.
Figure 4:
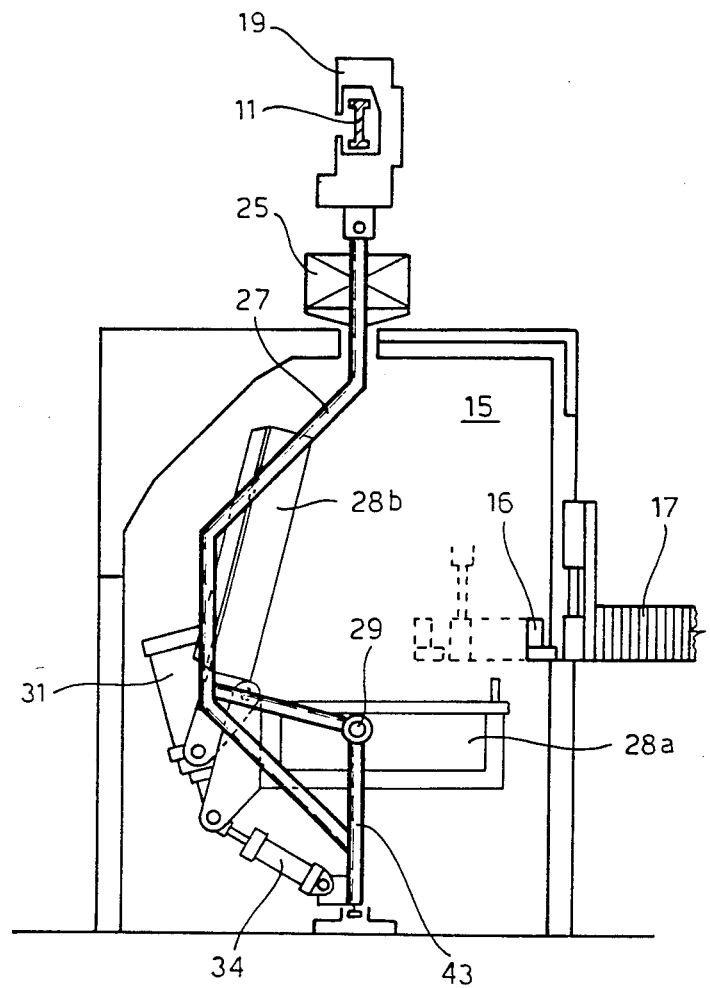
FIG. 4 shows a view similar to that of FIG. 3 at the work station in which the polyurethane mixture is fed into the mold, with the open mold in a horizontal position.
Figure 5:
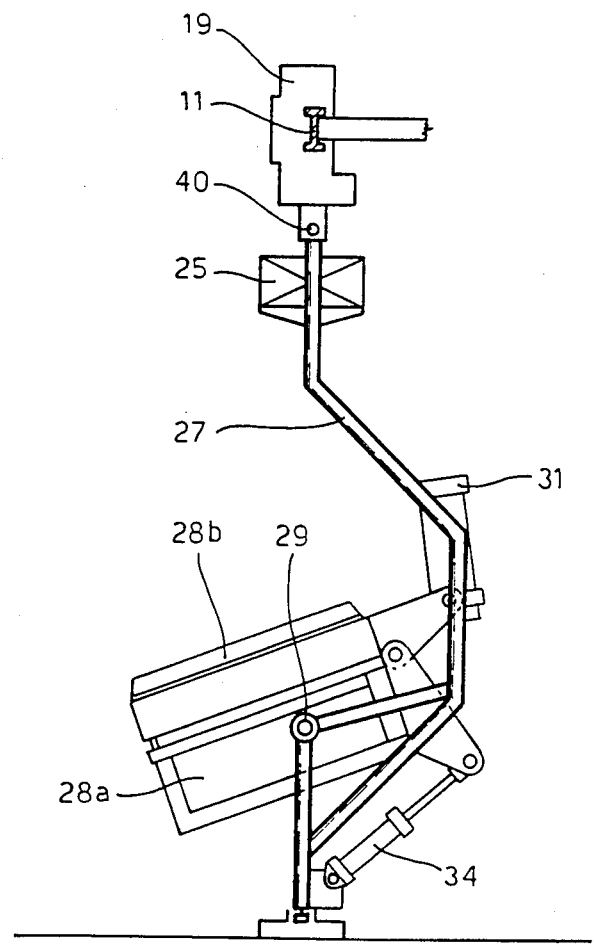
FIG. 5 shows a view similar to that of the previous figures, with the mold closed and in movement for the resin polymerization along the production line.

FIGS. 3, 4 and 5 show a particular disposition of the press and the mold, in the various work stations and along the production line of the system; in particular FIG. 3 shows the condition of the carriage in the station 13 where the molded articles are removed and the empty mold is prepared for the subsequent molding operation. The mold is open with the lid completely raised and with the lower portion sloping towards the operator who can easily lean forward without any danger whatsoever due to the complete absence of any moving parts.

FIG. 5 shows the carriage with the mold open in station 15 where the polyurethane mixture is fed into the mold; in the case shown, the mixture is poured into the open mold, however it is obvious that the mixture could be fed by injecting it into a closed mold. It should be noted that, according to this invention, each mold supporting carriage 10 can be stopped in the polyurethane feeding station thanks to the independent control devices of each carriage, which offers considerable advantages in terms of production due to the fact that, unlike the conventional carriage systems where it is not possible to stop a single carriage without stopping the whole unit, a system provided with independent self-propelling carriages on a monorail according to this invention makes it possible to feed the polyurethane mixture into a statioary mold, which results in a better distribution of the mixture in the mold cavity, while the other carriages proceed along the production line.

Lastly, FIG. 5 of the accompanying drawings shows the inclined position that the press and the mold assume along the section of the described system in which polymerization of the resin takes place.

The plant, in brief, operates as follows: the carriages 10 move at a constant speed along the monorail 11, according to a work program controlled by the central logic unit 26. When a carriage 10 approaches the discharging station 13, a sensor detects its position and its approaching and a signal is transmitted to the peripheral control unit 25, to brake and to stop the carriage in the desired position. At this point, the peripheral unit 25 of said carriage, or the general program of the central logic unit itself sends a signal to connect the source 38 of compressed air to the manifold 36 of the carriage. The automatic valves 37 are then actuated in the desired sequence to rotate the press forward and to open the mold, as shown in FIG. 3. The operator can then carry out all the necessary operations for removing the molded article which is then taken away by the conveyor 14, or for cleaning the mold, applying a release agent and in general for preparing the mold for a subsequent molding operation.

The mold is rotated to a horizontal position and moved by the carriage to the molding station 15 shown in FIG. 4, after having disconnected the manifold 36 from the supply source of the fluid under pressure, at station 13. Since the valves 37 retain the fluid under pressure remaining in the pneumatic circuit of the press, the latter and the mold remain open during the passage to the next work station.

On arrival, the pneumatic circuit of the press is reconnected to a further source 38 of fluid under pressure of this station and the mixing head 16 for feeding the polyurethane mixture is actuated. The press is then operated to close the mold, made to slope towards the other side, and the carriage is then made to depart again at the desired speed, in order to cover the remaining portion of the annular path on the monorail 11, and to complete the polymerization of the resin. The speed at which the carriages move along the path 11 can obviously be differentiated according to specific needs: for example, the carriages can move slowly along the section in which the polymerization of the resin takes place, or at the beginning of this section, and then accelerated to a higher speed. Moreover, the carriages can be transferred as fast as possible from one station to another, thereby shortening the production times and increasing the productivity of the system, due precisely to the totally independent movement and control of the individual carriages with their relative presses. Whenever a carriage has to be removed from the main production line to be sent, for example, towards a maintenance area 17 for removal or replacement of the mold, it can be done fully automatically or can be controlled by the operator. In fact, it is sufficient to send a signal to actuate the first points 18 in order to divert the carriage onto the monorail 11' towards the work area 17. After having replaced the mold, the carriage can be put back into circulation in the same automatic and controllable way by actuating the other points 18, entirely independently of the carriages 10 moving along the monorail 11. It is obviously also possible to create additional or separate paths, and to simultaneously mold different articles with the same system, which require different quantities of polyurethane material, or which require different polymerization times, since it is sufficient to provide the system with one or more decives for feeding the polyurethane, and to move the various carriages along appropriate paths of different lengths, or differently positioned even though they share part of the main path relative to the work station area and/or part of the polymerization path. Furthermore, the versatility of the system, as compared with conventional systems, results from the fact of being able to arrange the various work stations in different positions, since, for example the station in which the molded articles are removed can be arranged separately from the station in which the molds are prepared and also placed at a distance in a more appropriate position, or on a branched path, according to the specific requirements.

It is clear therefore that the use of self-propelled carriages, movable along a monorail, for supporting a press for closing a mold for producing polyurethane articles, and their combination with an independent pneumatic control system provided on each carriage, constitutes a substantial innovation in this particular field of application, which is not conceivable or achievable with conventional systems.

What is claimed is:

1. A plant for molding polyurethane articles in which the molds are provided on carriages movable along an annular path, said plant comprising: an annular monorail track, work stations along said track for feeding a polyurethane mixture into the molds, and for removing the molded articles, each mold having on an independent motorized carriage movable along said a monorail, pneumatically actuated control means, for opening and closing the mold and fluid feeding means on the carriage said fluid feeding means being connectable to and disconnectable from a mixed source of fluid under pressure in pre-established points of said track, each mold supporting carriage further comprising a peripheral control unit connected to a central control unit of the plant, by dialogue conductors along said monorail, for controlling said carriage and said control means.

2. A plant as claimed in claim 1, in which each carriage comprises a mold supporting a frame tiltable on a horizontal axis and by the fact that supplementary guide means are provided for guiding said mold supporting frame, along at least a part of said track for the carriages.

3. A plant as claimed in claims 1 or 2, in which said pneumatically actuate control means for opening and closing a mold comprises a press said press being supported by said frame and being angularly pivotable on a horizontal axis, and pneumatically actuated cylinders, said cylinders being pivoted to the press and to the frame to control the opening and closing of the mold supporting press, and respectively the angular overturning of the press itself.

4. A plant as claimed in claim 1, said plant in comprising a main work track for the carriages and at least one branched off track towards an additional work area, connectable to the first one by points means.

5. A plant as claimed in claim 4, comprising a separate work station, along the branched-off track.

6. A plant as claimed in claim 5, in which said separate work station is a demolding station for the molded articles.

7. A plant as claimed in claim 1, comprising at least a first set of mold supporting carriages for a first type of mold, and a second set of mold supporting carriages for a second type of mold; a main track common to said first and the second set of carriages, said main track comprising a first track portion provided with work stations, and a second track portion for the polymerization of the resin in said first type of molds; as well as a branched-off track for polymerization of the resin in said second type of molds, and automatic control means for switching the carriages from the main path to the branched-off track.

8. A plant as claimed in claim 1, in which the mold supporting carriages are made to move at different speeds along at least part of the main track.

9. A plant as claimed in claim 7 in which the mold supporting carriages are made to move at different speeds along at least part of the main track or the branched-off track.

10. A plant as claimed in claim 1, in which each carriage is provided with an independent, rechargeable compressed air tank.

* * * * *